United States Patent [19]

Galazin et al.

[11] Patent Number: 5,112,078

[45] Date of Patent: May 12, 1992

[54] AXLE MOUNTING ASSEMBLY

[75] Inventors: Gregory T. Galazin, Montague; William C. Pierce, Muskegon, both of Mich.

[73] Assignee: Neway Corp., Muskegon, Mich.

[21] Appl. No.: 633,120

[22] Filed: Dec. 21, 1990

[51] Int. Cl.⁵ .............................................. B60G 11/26
[52] U.S. Cl. .................................... 280/711; 280/688
[58] Field of Search ............. 280/711, 712, 713, 688, 280/708, 718, 678, 683

[56] References Cited

U.S. PATENT DOCUMENTS

| | | | |
|---|---|---|---|
| 3,332,701 | 7/1967 | Masser | 280/713 |
| 3,547,215 | 12/1970 | Bird | 180/71 |
| 3,707,298 | 12/1972 | Henry et al. | 280/717 |
| 4,261,597 | 4/1981 | Vandenberg | 280/688 |
| 4,371,190 | 1/1983 | Vandenberg | 280/705 |
| 4,595,216 | 6/1986 | Ware | 280/661 |
| 4,615,539 | 10/1986 | Pierce | 280/690 |
| 4,693,486 | 9/1987 | Pierce et al. | 280/80.1 |

*Primary Examiner*—Kenneth R. Rice
*Attorney, Agent, or Firm*—Varnum, Riddering, Schmidt & Howlett

[57] ABSTRACT

An axle bracket for mounting a vehicle suspension system to an axle for ground-engaging wheels. The axle bracket incorporates a wrapper plate complementary to the surface of the axle. The sides of the wrapper plate extend to approximately the midpoint of the axle and is welded thereto. The wrapper plate may incorporate one or more fingers on the ends thereof. In addition to fingers, one or more notches may be incorporated on the end of the wrapper plate. The wrapper plate is welded to the axle such that the weld is tapered toward the end of the finger and may wrap around the end of the finger. The finger and notch configuration and tapered weld create an axle bracket able to withstand the torsional and shear forces as well as driving or breaking torque incidental to the operation of the vehicle.

41 Claims, 9 Drawing Sheets

AXLE MOUNTING ASSEMBLY

BACKGROUND OF THE INVENTION

1. Technical Field

This invention relates to vehicle suspension systems for mounting ground-engaging wheels to a vehicle frame, and, more particularly, to a trailing arm suspension axle assembly for securing a wheel-carrying axle to a vehicle.

2. Description of Related Art

Vehicle suspensions having an arm pivotably mounted to a vehicle frame typically have an air spring mounted between a free end of the arm and the frame and an axle mounted to the top of the arm. An example of one such suspension is disclosed in the U.S. Pat. No. 3,332,701 to Masser (issued Jul. 25, 1967). In Masser '701, the axle is positioned on two bracket plates which cradle the axle. The brackets are rigidly secured to the axle by welding and are secured to the trailing arm by a bushed two-pin connection. It is also known to attach a flat plate between the bracket plates and weld the axle to the flat plate.

In U.S. Pat. No. 4,371,190 to VanDenberg (issued Feb. 1, 1983), a similar suspension is shown wherein a saddle plate extends between the spaced bracket plates and welds are provided between the saddle plates and the axle. Further, the axle is clamped to the saddle plates through U-bolts which are bolted to a beam housing beneath the beam or arm. U.S. Pat. No. 4,261,597 to VanDenberg (issued Apr. 14, 1981) discloses a similar structure wherein the welds can extend between the side plates and the axle as well. The VanDenberg suspensions are relatively heavy and bulky due to the many brackets, plates, beam housing and U-bolt assemblies.

U.S. Pat. No. 4,615,539 to Pierce (issued Oct. 7, 1986) discloses a suspension system wherein a bracket incorporating a complementary surface is welded to the axle. The complementary surface of the bracket extends at least 90° and preferably approximately 150° around the axle. The bracket is attached to the trailing arm by bushed connections.

Axle brackets are often welded to an axle by a process utilizing several welding passes to create several weld beads. The beads often end at different points along the length of the weld in order to avoid a single weak point or stress concentration point in the weld. However, the known welding processes all start at the same point at the edge of the weld bracket.

Each of the above-described suspension systems are subjected to many different forces and stresses encountered in the operation of the vehicle. The trailing arms and plates are subjected to severe shear or lateral forces. The top and bottom surfaces of the axle are subjected to severe bending stresses as a result of loading of the vehicle. The midpoint of the side of the axle is relatively free from these bending stresses. Therefore, axle brackets are usually attached to the axle at a point adjacent to the axle side-midpoint. Although generally free from these bending stresses, the weld connection between the axle brackets and axle are subject to severe torsional and shear forces as well as drive or braking torque incidental to the operation of the vehicle. These torsional stresses may cause stress cracking of the axle, the bracket or the weld, thereby necessitating costly repair or replacement of the suspension system.

SUMMARY OF THE INVENTION

The invention provides an improved means to attach the suspension system to the axle whereby the operating lifetime of the suspension system is extended without adding significant weight or expense.

The invention relates to a vehicle suspension system for mounting ground-engaging wheels to a vehicle frame. The system comprises at least two substantially rigid arms which are secured to opposite sides of the frame through substantially aligned pivot mounts. At least one wheel-carrying axle is mounted between these arms. A bracket assembly secures the axle to each of the arms wherein the assembly comprises a wrapper plate having an elongated surface complementary to the axle. The wrapper plate has longitudinal side edges and end edges. Welds are created between the side edges of the wrapper plate and the axle to secure the wrapper plate to the axle. The wrapper plate has a notch at one end edge forming at least one finger at one corner of the wrapper plate. One of the welds extends along an outer edge of the finger.

Preferably, the weld extends around the finger and along a portion of an inner edge of the finger. In one embodiment, the edge of the wrapper plate on which the finger is mounted is the inboard edge. In addition, the finger may extend beyond the inboard edge of the wrapper plate. The finger may be designed such that it tapers along the length thereof wherein the end of the finger is of less width than the base. The finger may also be designed such than it narrows along the length thereof wherein the end of the finger is of less thickness than the base. In addition, the notch can have a tapered surface which forms an acute angle between the complementary surface of the wrapper plate and the tapered surface of the notch.

In a further embodiment, a second finger may be incorporated at a second corner of the wrapper plate. A second weld is utilized and extends along the outer edge of the second finger. In a further embodiment, the weld may extend around the end of the finger and along a portion of an inner edge thereof. In addition, the first or second finger may narrow along the length thereof such that an end of the finger is of less thickness than the base thereof.

In various embodiments, the first or second finger may taper along the length thereof such that an end of the finger is of less width than the base thereof.

In one embodiment, the second finger is created by an second notch. The second and first notches may both be mounted on the inboard end of the wrapper plate such that a central tab portion is created between the two notches. In addition, at least one of the first or second notches has a tapered surface which forms an acute angle between the complementary surface of the wrapper plate and the tapered surface of the notch.

In yet another embodiment, a second notch is incorporated on the other end of the wrapper plate creating at least one additional finger on the wrapper plate. The first notch is generally arcuate in shape and is located at a central portion of the inboard edge thereby creating both a first finger and a second finger on the inboard corners of the wrapper plate. One or both of said fingers can taper along the length of the finger such that an end of the finger is of less width than the base. In addition, one or both of these fingers may narrow along the length thereof wherein the end of the finger is of less thickness than the base.

The second notch in this embodiment is located at a central portion of the outboard end edge and is generally arcuate in shape. This second notch forms third and fourth fingers at the outboard corners of the wrapper plate. Preferably, a tapered surface on at least one of the first or second notches forms an acute angle between the complementary surface of the wrapper plate and the tapered surface of the notch.

BRIEF DESCRIPTION OF THE DRAWINGS

The invention will now be described in detail with reference to the accompanying drawings wherein.

DESCRIPTION OF PREFERRED EMBODIMENT

Figure 1:
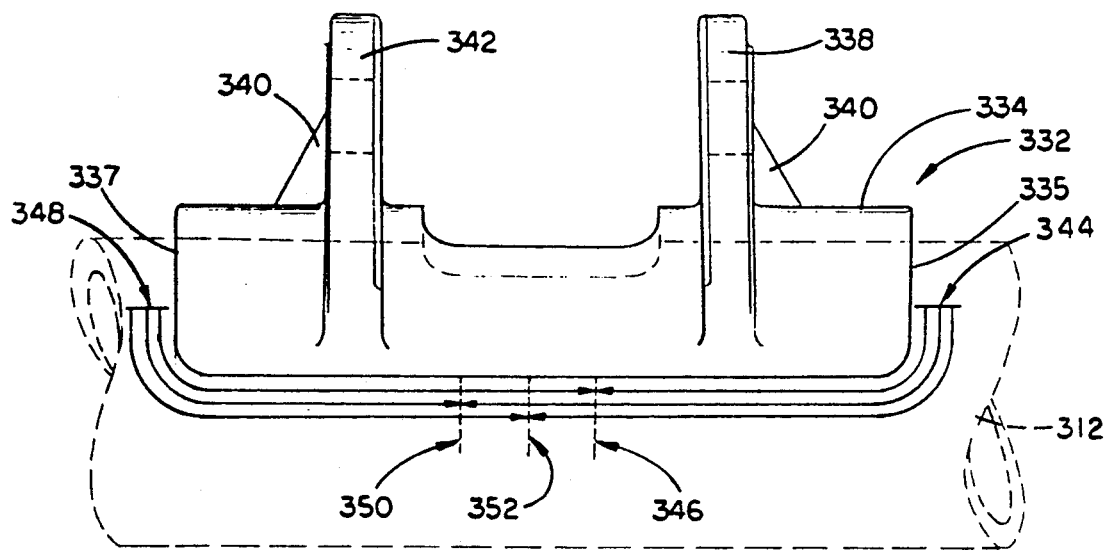
FIG. 1 (prior art) is a side elevational view of a prior art axle bracket, illustrating a welding configuration.

Referring now to the drawings, FIG. 1 shows a known axle bracket structure and the welding process which has been used to mount axle brackets to an axle. As seen in FIG. 1, an axle 312 has an axle bracket 332 supported thereon. The axle bracket 332 comprises a wrapper plate 334, a first side plate 338, a second side plate 342 and a plurality of gussets 340. The first and second side plates, 338 and 342, are used to fixedly attach the axle bracket 332 to a trailing arm (not shown). Gussets 340 provide support for the first and second side plates 338 and 342.

FIG. 1 also shows a known multiple layer welding method utilized in the prior art to mount the axle bracket 332 to the axle 312. The welding method involves six distinct welding passes on each longitudinal side of the wrapper plate 334. The six individual welding passes are staggered such that a three layer weld bead is created along the entire length of plate 334. Three of the weld passes begin at a first weld start point 344 and the remaining three weld passes begin at a second weld start point 348. The first weld pass begins at first weld start point 344 which is on inboard end 335 of the wrapper plate 334. A single layer weld bead is created along the edge where wrapper plate 334 contacts axle 312. The first welding pass terminates at a first weld stop point 346. A second welding pass is started at second weld start point 348 on outboard end 337 of wrapper plate 334. This second welding pass also ends at first weld stop point 346. After the first and second welding passes have been completed, a single layer weld bead extends from inboard end 335 to outboard end 337.

A third and fourth welding pass are utilized to create the second layer weld bead. The third welding pass begins at first weld start point 344 and ends at a second weld stop point 350 which is a finite predetermined distance away from first weld stop point 346. Likewise, the fourth welding pass begins at second weld start point 348 and ends at second weld stop point 350 such that a continuous second layer weld bead is created extending from inboard end 335 to outboard end 337.

A third and final weld bead layer completes the welding method. The third layer weld bead is created by a fifth and sixth weld pass. The fifth pass begins at first weld start point 334 and ends at a third weld stop point 352. Third weld stop point 352 is a finite predetermined distance away from second weld stop point 350 and first weld stop point 346. The sixth welding pass begins at second weld start point 348 and ends at third weld stop 352. Through these six distinct welding passes and the staggered ending points, a three layer weld bead is created along the longitudinal end of wrapper plate 334. The three stop points, 346, 350 and 352 are spaced a finite distance away from each other.

This invention creates an axle bracket and a weld able to withstand the torsional stresses encountered during operation of the suspension system 16.

Figure 2:
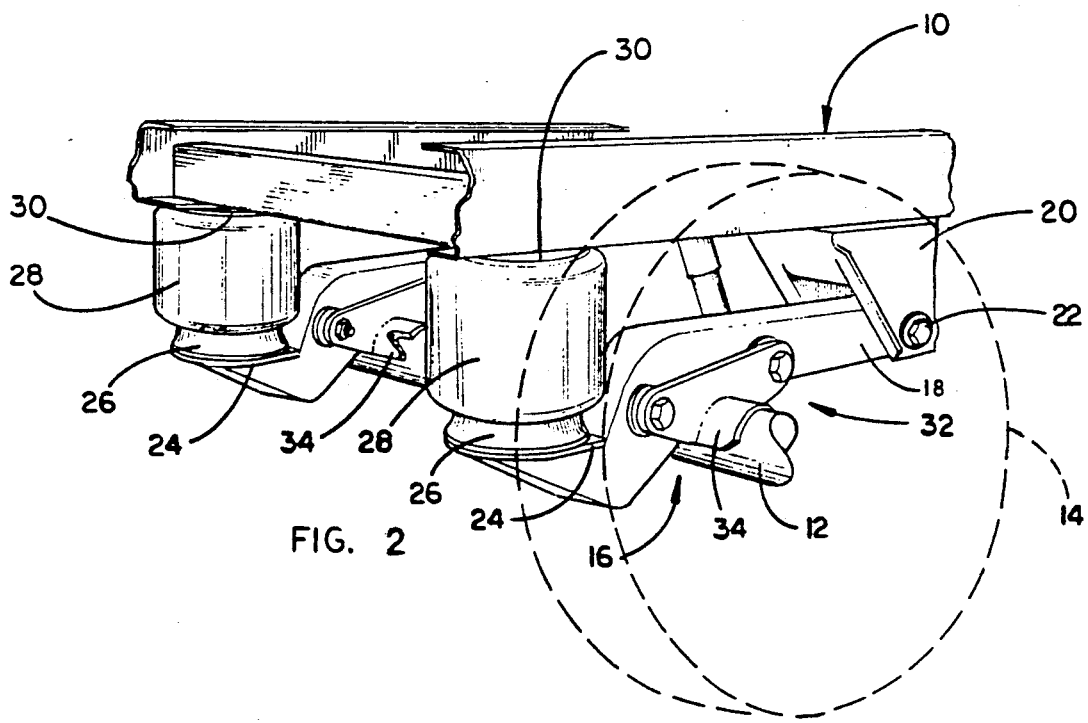
FIG. 2 is a partial perspective view of a vehicle trailing arm suspension system according to the invention.

Referring now to FIG. 2 in particular, a vehicle frame 10 has an axle 12 and ground engaging wheels 14 suspended therefrom by a suspension system 16 according to the invention. The front of the vehicle is to the right side of the frame as seen in FIG. 2. Suspension 16 includes, at each side of the vehicle frame 10, a trailing arm 18 pivotably mounted to a frame bracket 20 depending from frame 10 at a pivotal mount 22. Each trailing arm 18 extends rearwardly of the vehicle and away from its pivotal mount 22 in a direction which is longitudinal of vehicle frame 10. Each trailing arm has an extension 24 which is fixedly attached to a pedestal 26 of an air spring 28. A top mounting plate 30 of air spring 28 is fixedly secured to vehicle frame 10.

Axle 12 is rigidly connected to each trailing arm 18 by an axle bracket 32. As seen in FIGS. 2-5, each axle bracket comprises a semi-cylindrical wrapper plate 34 which partially surrounds axle 12 and is rigidly secured to axle 12 generally at the midpoint of the side of axle 12. A first side plate 38 is mounted near one end of the wrapper plate 34 and a second side plate 42 is mounted near the other end of wrapper plate 34. The plates are mounted transverse to the longitudinal axis of axle 12. The spacing between the opposing surfaces of the first and second side plates, 38 and 42, is substantially equal to the width of trailing arm 18.

A plurality of gussets 40 are mounted to the wrapper plate 34 and side plates 38 and 42. The gussets 40 provide strength and resistance to the numerous stresses which are exerted on the suspension 16 between the wrapper plate 34 and sides plates 38 and 42. Typically, the gussets 40 are generally triangular in shape such that a first leg 46 is fixedly attached to the wrapper plate 34 and a second leg 48 is fixedly attached to one of the first or second side plates 38 or 42. All of the foregoing elements of the axle bracket 32 are preferably made of steel plate and are attached together by welding along adjoining surfaces. Alternatively, the axle bracket 32 may be a casting.

First side plate 38 and second side plate 42 each have a pair of apertures 44 aligned with two sets of openings (not shown) in trailing arm 18. Each set of trailing arm openings is aligned transversely of the longitudinal axis of trailing arm 18. The axle bracket 32 is mounted to trailing arm 18 by a suitable bushing (not shown) and pin (not shown). The bushing and pin connection is described in detail in U.S. Pat. No. 4,615,539 to Pierce, which is expressly incorporated herein by reference.

Wrapper plate 34 is preferably designed with a hole 36. Hole 36 provides clearance for trailing arm 18, reduces the weight of axle bracket 32 and gives axle bracket 32 flexibility. Although, in the assembled configuration, trailing arm 18 does not interfere with wrapper plate 34 nor rests within hole 36, hole 36 does provide clearance for trailing arm 18 in the event that the elastomeric linings of the bushings (not shown) wear. Over the useful life of the bushings, the elastomeric linings thereof wear due to torsional and lateral forces exerted thereon. As the bushing (not shown) wears, trailing arms 18 settle and rest closer to wrapper plates 34. Hole 36 provides clearance for trailing arm 18 in the event of such settling. Hole 36 also provides flexibility in the axle bracket both during assembly of the suspension 16 and during operation of the vehicle.

Figure 3:
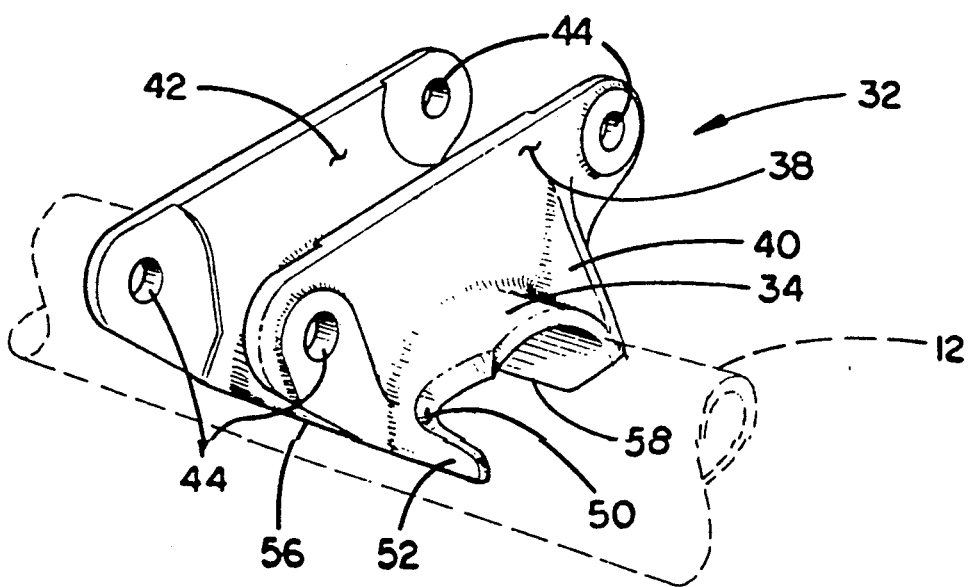
FIG. 3 is perspective view of a first embodiment of the axle bracket according to the invention.
Figure 4:
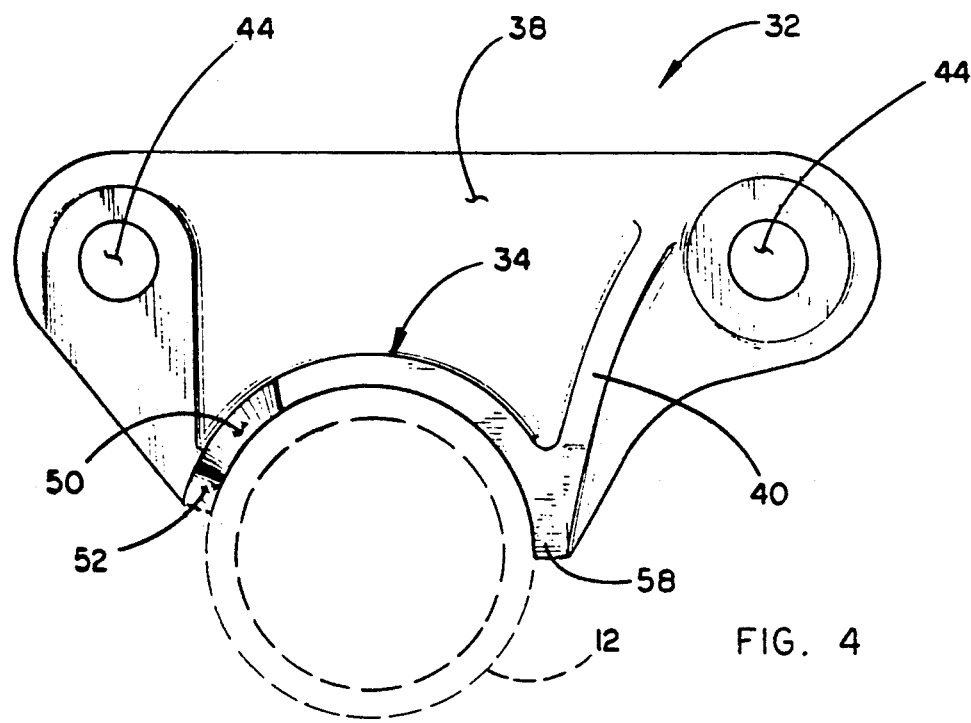
FIG. 4 is an end elevational view of the first embodiment of the axle bracket as seen in FIG. 3.
Figure 5:
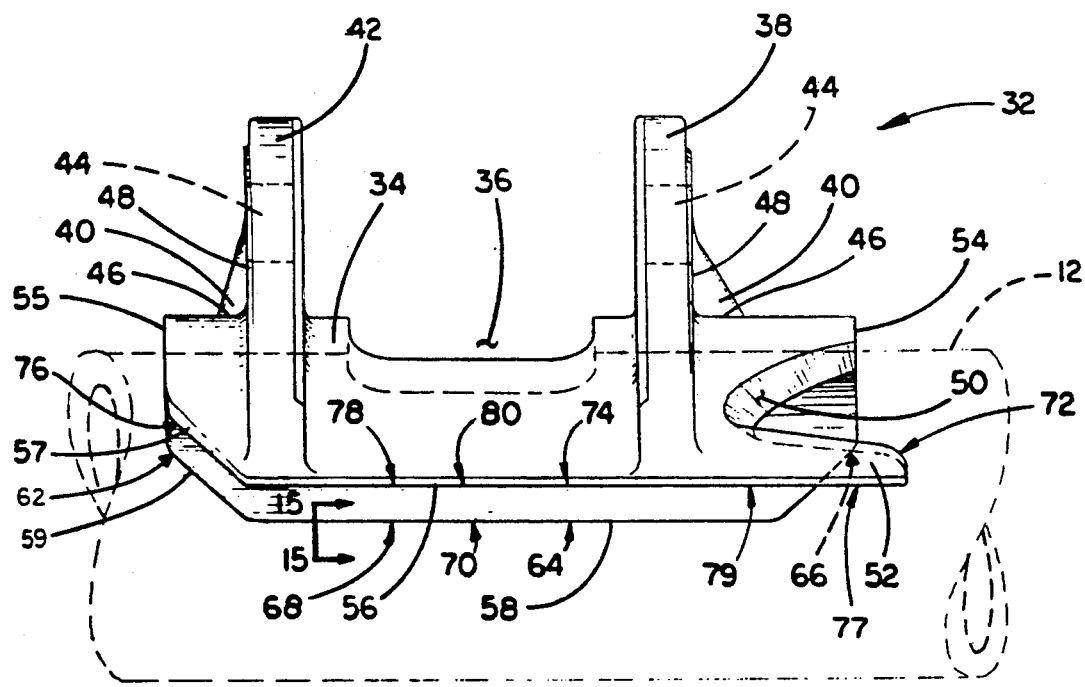
FIG. 5 is a side elevational view of the first embodiment of the axle bracket as seen in FIG. 3.
Figure 6:
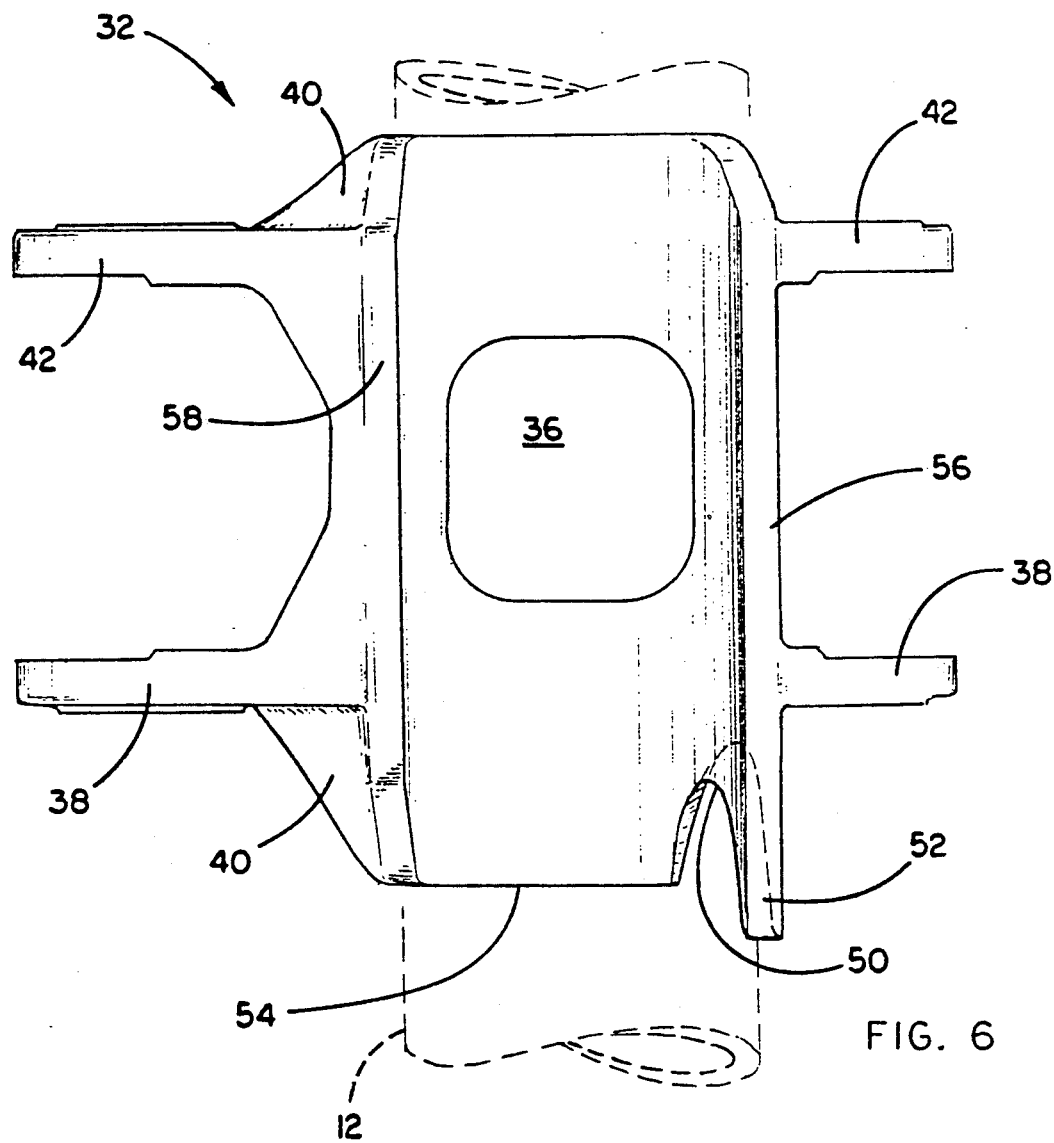
FIG. 6 is a bottom view of the first embodiment of the axle bracket as seen in FIG. 3.
Figure 7:
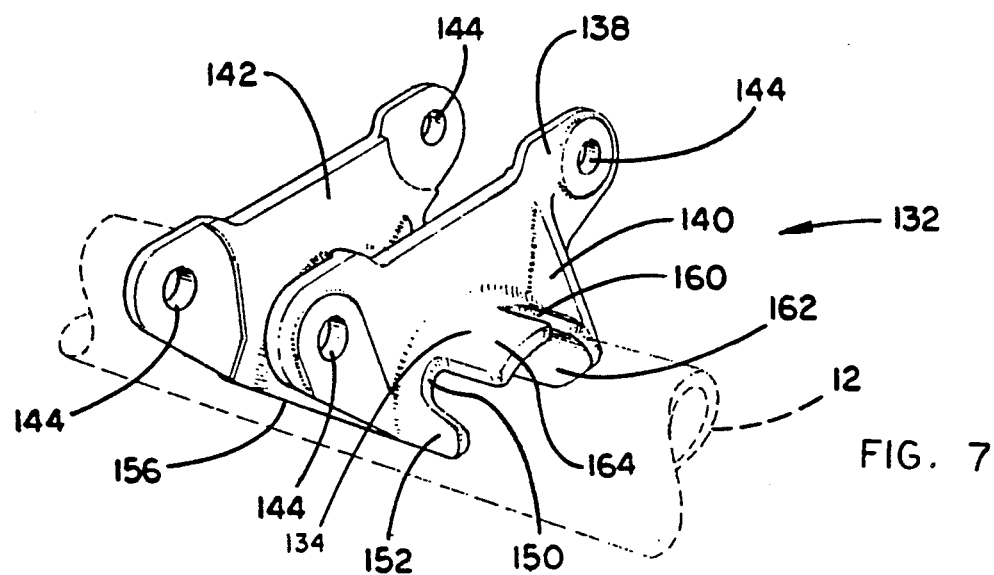
FIG. 7 is perspective view of a second embodiment of the axle bracket according to the invention.
Figure 8:
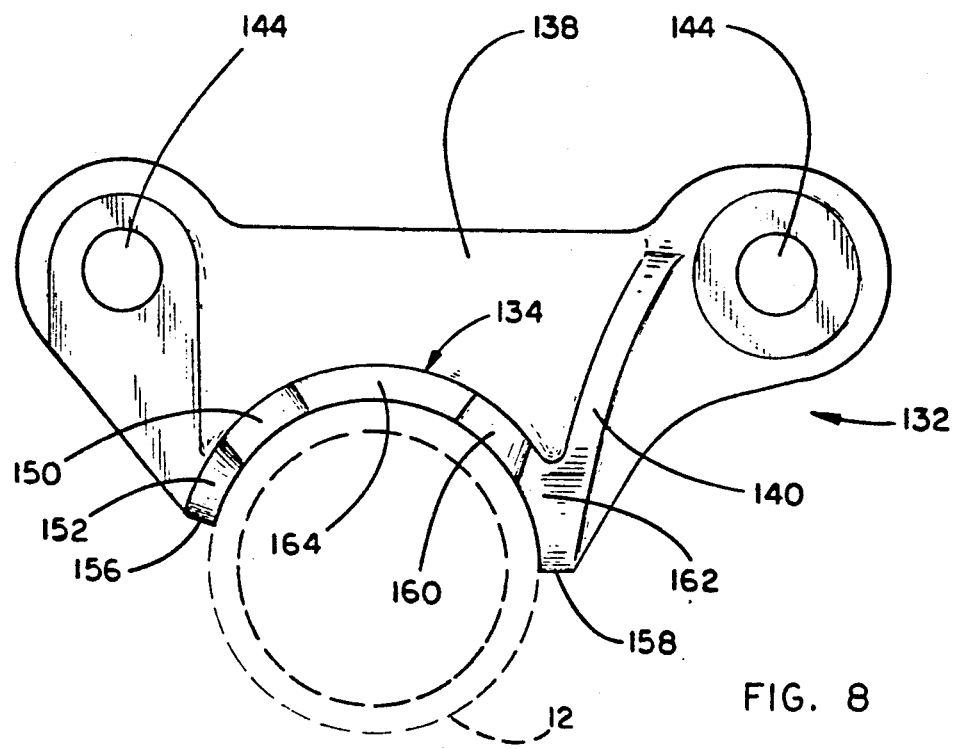
FIG. 8 is an end elevational view of the second embodiment of the axle bracket as seen in FIG. 7.

As seen in FIG. 3, the wrapper plate 34 of the first embodiment incorporates a single notch 50 and an adjacent finger 52. The finger 52 is incorporated at the inboard rear corner (see FIG. 2) on an inboard end 54 of the wrapper plate 34 and extends longitudinally along axle 12. As seen in FIGS. 4 and 5, finger 52 extends beyond the inboard end 54 of wrapper plate 34. An outboard end 55 of wrapper plate 34 does not incorporate any notches or fingers. However, the outboard end 55 does incorporate a first sloping edge 57 and second sloping edge 59.

The axle bracket 32 is fixedly attached to the axle 12 by suitable means, such as welding. The bracket is welded along two longitudinal edges 56 and 58 of wrapper plate 34.

The sides of wrapper plate 34 of the first embodiment extend around the top of axle 12 to approximately the midpoint of axle 12. The midpoint of axle 12 is not subjected to the bending stresses encountered in loading of the vehicle, these stresses are found on the top and bottom surfaces of the axle. However, the weld along edges 56 and 58 are subjected to torsional stresses encountered during braking and cornering of the vehicle. The unique configuration of wrapper plate 34 and the welding process described below permit sufficient flexibility in the suspension system to absorb, endure and spread these torsional stresses along the length of the wrapper plate 34.

Figure 15A:
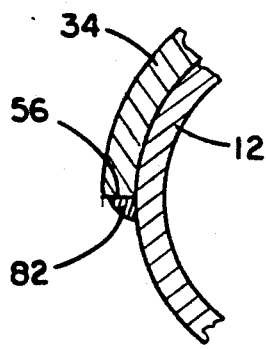
FIG. 15A is a partial sectional view taken along lines 15—15 of FIG. 5 after the first weld pass according to the invention.

As seen in FIG. 5, the welding process for mounting the axle bracket 32 to the axle 12 is accomplished by twelve individual welding passes, six along edge 56 and six along edge 58. Welding along the second longitudinal edge 58 begins with a first weld pass starting at first weld start point 62 and continuing along edge 58 and terminates at a first weld stop point 64. The second weld pass begins at a second weld start point 66 and continues along edge 58 and terminates at first weld stop point 64. After the first and second weld passes, a first layer weld bead 82 extends along the entire length of edge 58. As seen in FIG. 15A, first layer weld bead 82 is created at the point at which axle 12 and the interior edge 58 of wrapper plate 34 meet.

Figure 15B:
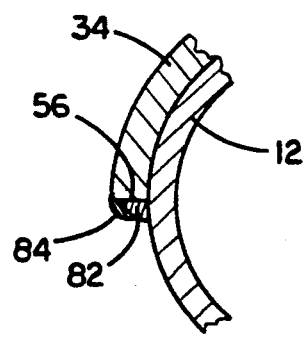
FIG. 15B is a partial sectional view taken along lines 15—15 of FIG. 5 after the second weld pass according to the invention.

A second layer weld bead 84 is applied by a third weld pass which begins at first weld start point 62 and ends at a second weld stop point 68. The fourth weld pass begins at second weld start point 66 and continues along edge 58 to second weld stop 68. As seen in FIG. 15B, second layer weld bead 84 is located at the edge of first weld bead 82 and the outside edge 58 of wrapper plate 34.

A third layer weld bead 86 is created by a fifth and sixth weld passes wherein the fifth weld pass begins at first weld start point 62 and ends at a third weld stop point 70. The sixth welding pass starts at second weld start point 66 and ends at the third weld stop point 70. Each of the weld stop points, 64, 68 and 70 are a distinct distance away from each other to avoid a stress concentration point where cracking may begin. In the preferred embodiment, first weld stop point 64 is one inch away from third weld stop point 70 and two inches away from second weld stop point 68.

Welding along first longitudinal edge 56 of the first embodiment is likewise accomplished by a multiple layer weld bead and six weld passes. However, the welding is tapered along finger 52 to create greater flexibility. The first weld pass begins at a first weld start point 72. The weld wraps around the end of finger 52 and then proceeds along edge 56 and terminates at a first weld stop point 74. The second weld pass begins at a second weld start point 76 and continues along first longitudinal edge 56 and terminates at the first weld stop point 74. The weld bead created by the first and second weld passes extends along the entire length of edge 56 and is similar to the single layer bead as seen in FIG. 15A.

The third and fourth weld passes create the second layer weld bead. The third weld pass begins at a third weld start point 77 which is on the opposite edge of finger 52 from first weld start point 72. Welding continues along edge 56 and terminates at a second weld stop point 78. The fourth weld pass begins at second weld start point 76 and proceeds along longitudinal edge 56 and terminates at second weld stop point 78. The second layer weld bead extends along the entire length of edge 56 except for the portion of finger 52 which extends beyond third weld start point 77. The configuration of the second layer bead is analogous to that seen in FIG. 15B.

The third layer bead of the weld is created by a fifth and sixth weld pass wherein the fifth weld pass begins at a fourth weld start point 79 and continues along edge 56 until reaching a third weld stop point 80. Fourth weld start point 79 is a distinct distance away from the edge of finger 52 and third weld start point 77. In the preferred embodiment, third weld start point 77 is approximately three-quarters of an inch away from the end of finger 52 and fourth weld start point 79 is approximately one and one-half inches away from end of finger 52.

The sixth weld pass begins at second weld start point 76 and continues along longitudinal edge 56 and terminates at third weld stop point 80. The configuration of the third layer weld bead is analogous to that seen in FIG. 15C.

Figure 15C:
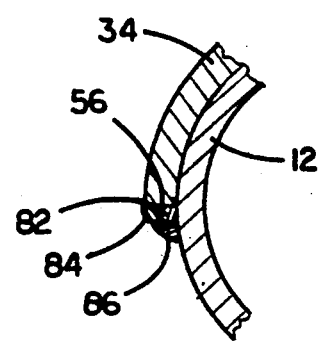
FIG. 15C is a partial sectional view taken along lines 15—15 of FIG. 5 after the third weld pass according to the invention.

The multiple layer weld bead achieved along edge 56 with these distinct starting and stopping points avoids stress concentration points along edge 56 which are subject to torsional stresses. In the preferred embodiment, first weld stop point 74 is a distinct distance, such as approximately one inch away from third weld stop point 80 and a distinct distance, such as two inches, away from second weld stop point 78. Different weld starting points 72, 77 and 79 are utilized around finger 52 such that the distance between points and 72 and 77 is a single layer weld bead, as seen in FIG. 15A, the distance between points 77 and 79 is a layer of two weld beads, as seen in FIG. 15B, and the distance between points 79 and 76 comprises a three layer weld beads, as seen in FIG. 15C. The thinner weld beads at the end of finger 52 allow for greater flexibility at the end and along the length of the finger. This increased flexibility permits the axle bracket and axle 12 to withstand greater torsional stress for greater loading cycles, thereby extending the lifetime of the axle 12 and axle bracket 32.

Although the welding process described in the preferred embodiment creates a three layer weld bead, the same varying thickness weld bead along edge 56 may be created by using a greater number or fewer number of weld passes. For example, a single layer weld bead may be created with two distinct weld passes along edge 56. The first weld pass would begin at first weld start point 72 and a relatively thin weld bead would be applied. When the welding pass reaches third weld start point 77, a somewhat thicker weld bead may be applied. When the welding operation reaches fourth weld start point 79 an even thicker weld bead can be created by a welding method such as "weaving". The first welding pass terminates at third weld stop point 80. The second welding pass, applying a weld bead of the same thickness as that applied between fourth weld start point 79 and third weld stop point 80 would begin at second weld start point 76. This weld pass would terminate at third weld stop point 80. Through this method, a relatively thin weld bead extends around the end of finger 52, a moderately thicker weld bead extends along much of the body of finger 52 and an even thicker weld bead extends along the remainder of edge 56.

Welded axle brackets known in the prior art have sometime exhibited cracking in the weld area during the lifetime of the suspension system. The axle bracket 32 is intended to minimize these cracks through the incorporation of notch 50 and finger 52 and the welding process employed. As discussed earlier, the welds along longitudinal edges 56 and 58 are subjected to torsional and shear stresses as well as drive or braking torque incidental to the operation of the vehicle. In order to distribute these stresses along the length of the wrapper plate 34, the notch 50 and finger 52 configuration has been incorporated.

The flexibility of the finger 52 can be increased by gradually tapering the width of finger 52 from the base toward the end of finger 52. The flexibility of finger 52 can also be increased by gradually tapering the thickness of finger 52 from the base toward the end of finger 52. Likewise, flexibility of notch 50 can be increased by tapering the surface of the notch such than an acute angle is created between the inside surface of wrapper plate 34 and the surface of notch 50.

A second embodiment of the axle bracket according to the invention is shown in FIGS. 7 through 10. In the description of this second embodiment, reference numerals of the first embodiment which are similar to reference numerals in the second embodiment will merely be increased by 100.

The second embodiment of axle bracket 132 comprises a semi-cylindrical wrapper plate 134 which is rigidly secured to axle 12 by welding along a first longitudinal edge 156 and second longitudinal edge 158. A first side plate 138 is mounted near one end of the wrapper plate 134 and a second side plate 142 is mounted near the other end of wrapper plate 134. The plates, 138 and 142, are mounted transverse to the longitudinal axis of axle 12. The spacing between the opposing surfaces of the first and second side plates, 138 and 142, is substantially equal to the width of trailing arm 18. A plurality of gussets 140 are mounted to wrapper plate 134 and side plates 138 and 142. The gussets 140 provide strength and resistance to the numerous stresses which are exerted on the suspension 16 between the wrapper plates 134 and side plates 138 and 142. Typically, the gussets 140 are generally triangular in shape such that a first leg 146 is fixedly attached to the wrapper plate 134 and a second leg 148 is fixedly attached to one of the first or second side plates 138 or 142. All of the foregoing elements of the axle bracket 132 are attached by welding along adjoining surfaces. Alternatively, the axle bracket 132 can be a casting.

As in the first embodiment, the second embodiment axle bracket 134 incorporates a pair of apertures 144 which are utilized to mount the bracket to trailing arm 18 in the same manner as previously described in the first embodiment. In addition, wrapper plate 134 incorporates a hole 136 which provides clearance and flexibility for the wrapper plate 134 in the same manner as previously described in the first embodiment.

At an outboard end 155 of wrapper plate 134, a first sloping edge 157 and a second sloping edge 159 are incorporated. First longitudinal edge 156 terminates at first sloping edge 157 and second longitudinal edge 158 terminates at second sloping edge 159.

At an inboard end 154 of wrapper plate 134, the second embodiment incorporates a first finger 152 at the inboard rear corner of wrapper 134 and a second finger 162 at the inboard front corner of wrapper 134. Adjacent to first finger 152 is a first notch 150. A second notch 160 is immediately adjacent second finger 162. Disposed between first notch 150 and second notch 160 is a central tab portion 164. As described below, this finger and notch configuration increases the ability of axle 12, wrapper plate 134 and the welds along edges 158 and 156 to withstand the severe torsional stresses.

Figure 9:
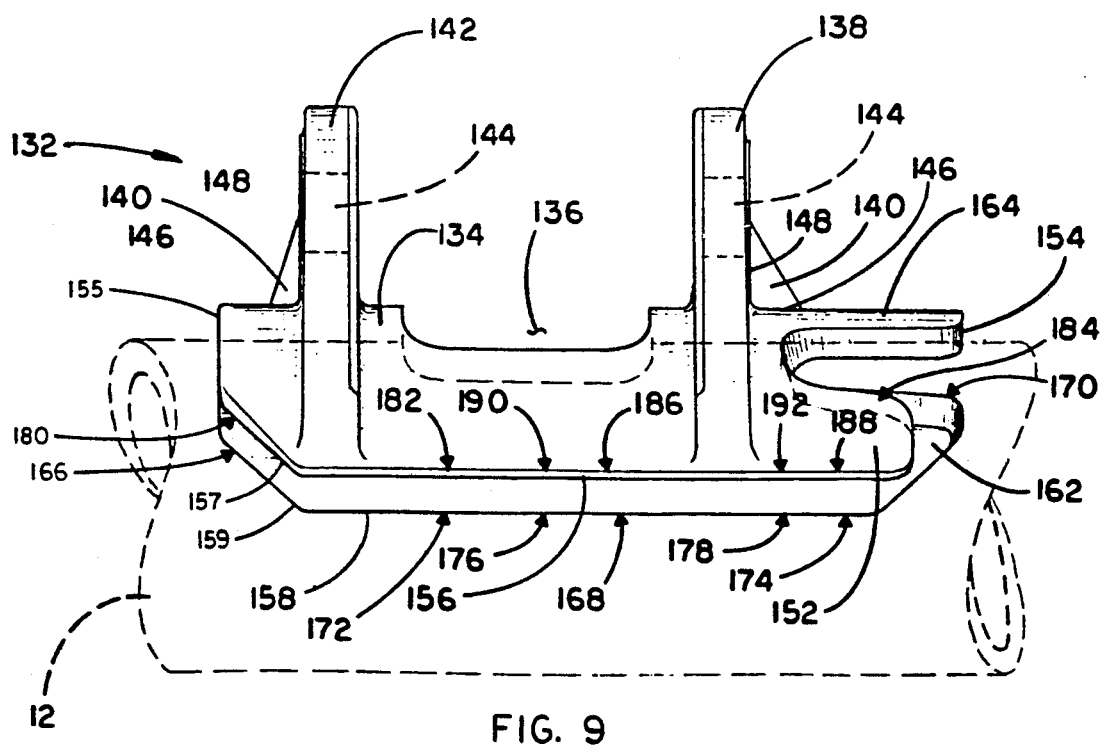
FIG. 9 is a side elevational view of the second embodiment of the axle bracket as seen in FIG. 7.

As seen in FIG. 9, welding of the axle bracket in the second embodiment is accomplished by creating the multiple layer weld on both edges, 156 and 158, as described in the first embodiment. Twelve distinct weld passes are used to create the multiple layer weld. The first weld pass along edge 158 begins at a first weld start point 166 and terminates at a first weld stop point 168. Second weld pass begins at a second weld start point 170, wraps around second finger 162 and terminates at a first weld stop point 168. This results in a single layer bead extending along the length of edge 158 similar to that seen in FIG. 15A.

The second layer weld bead of the multiple layer weld along edge 158 is created by the third and fourth weld passes. The third weld pass begins at a first weld start point 166 and terminates at a second weld stop point 172. The fourth weld pass begins at a third weld start point 174 which is on the other side of finger 162 from second weld start point 170. The fourth weld pass continues along edge 158 and terminates at second weld stop point 172. The two layer weld bead created by these weld passes is similar to that seen in FIG. 15B.

The third layer weld bead is created by the fifth and sixth weld passes. The fifth weld pass begins at first weld start point 166 and terminates at a third weld stop point 176. The sixth weld pass begins at a fourth weld start point 178 and terminates at third weld stop point 176. The multiple layer weld created by these weld passes is similar to that seen in FIG. 15C.

A multiple layer weld is utilized along the length of edge 156 in the same manner that the weld was created in the first embodiment along edge 56 (FIG. 5). Six distinct weld passes are utilized to create the three layer weld bead configuration. First weld pass begins at a first weld start point 180 and terminates at a first weld stop point 182. The second weld pass begins at a second weld start point 184 and wraps around the end of finger 152 and terminates at first weld stop point 182. The third weld pass begins at first weld start point 180 and terminates at second weld stop point 186. Fourth weld pass begins at a third weld start point 188 which is on the opposite side of finger 152 from second weld start point 184. The fourth weld pass terminates at second weld stop point 186. Fifth weld pass begins at first weld start point 180 and terminates at third weld stop point 190. Sixth weld pass begins at a fourth weld start point 192 and terminates at third weld stop point 190.

The three layer weld bead exists along the length of edge 156 between first weld start point 180 and fourth weld start point 192. This three layer bead construction is analogous to that shown in FIG. 15C. A two layer weld bead exists between fourth weld start point 192 and third weld start point 188 analogous to that seen in FIG. 15B. A single layer weld bead wraps around the end of finger 152 between third weld start point 188 and second weld start point 184 analogous to the bead seen in FIG. 15A.

Although the preferred embodiment incorporates a three layer weld bead along longitudinal edges 156 and 158, a greater or lesser number of weld bead layers may be used, as described in the first embodiment.

Figure 10:
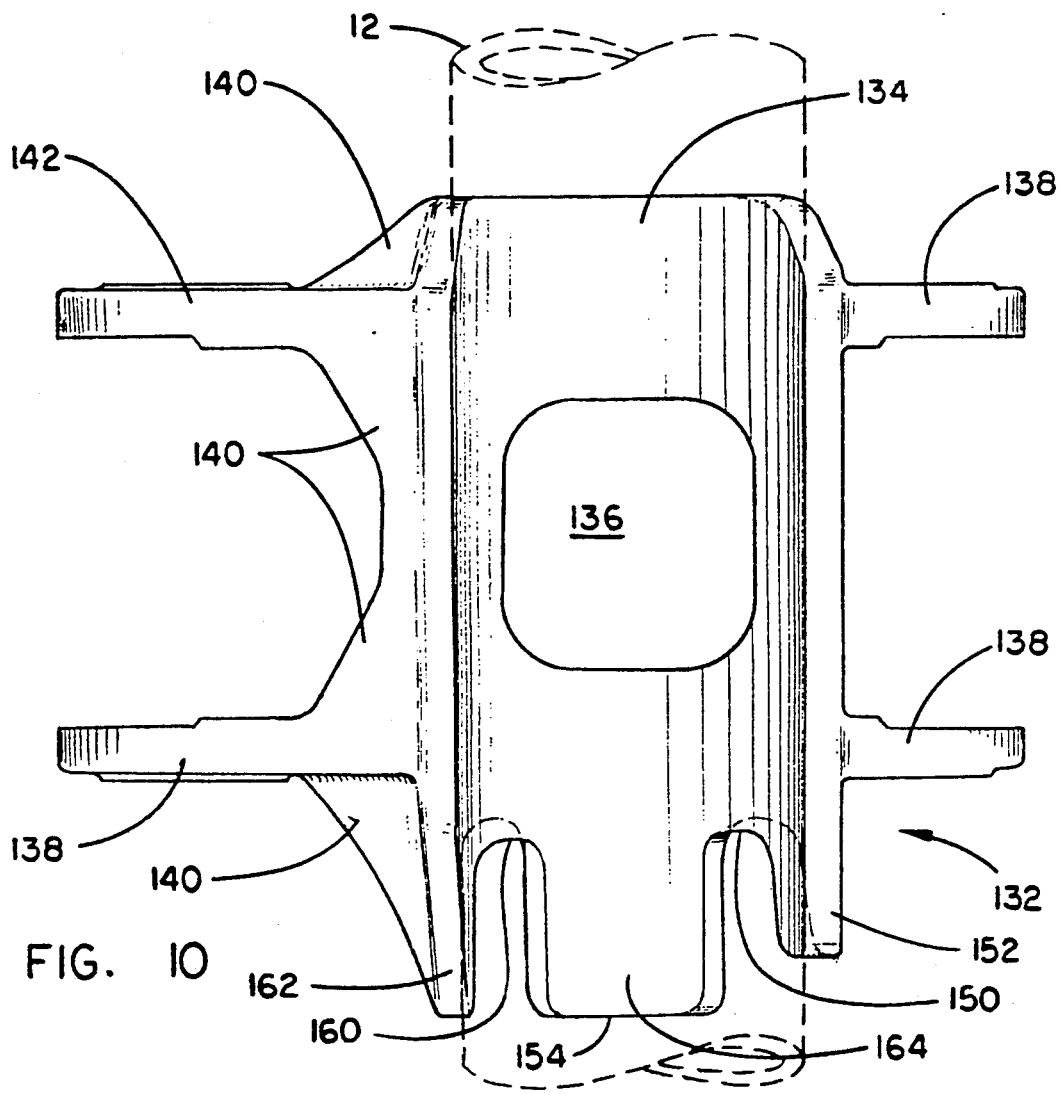
FIG. 10 is a bottom view of the second embodiment of the axle bracket as seen in FIG. 7.
Figure 11:
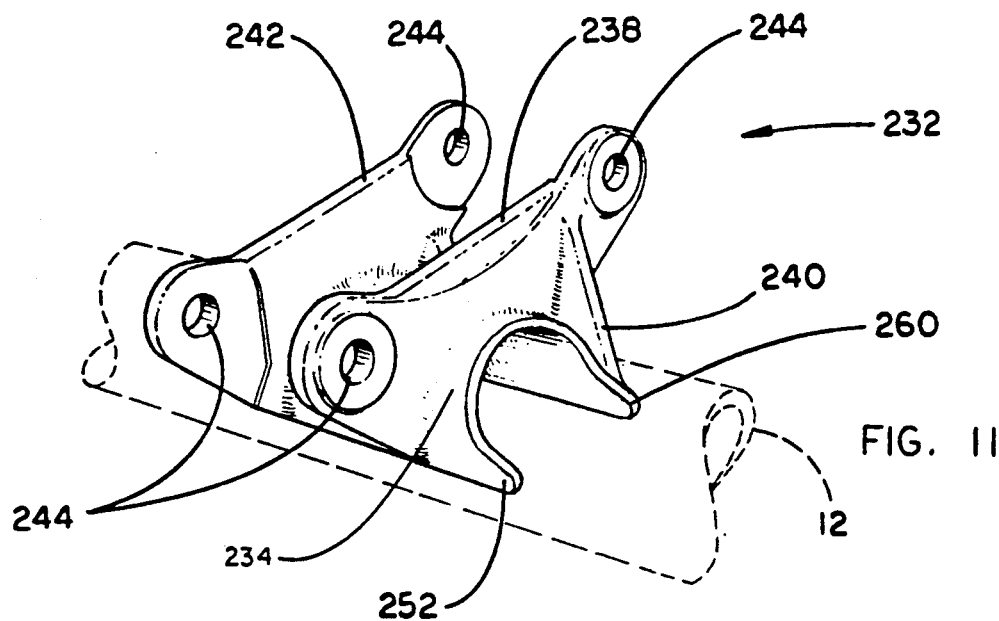
FIG. 11 is perspective view of a third embodiment of the axle bracket according to the invention.
Figure 12:
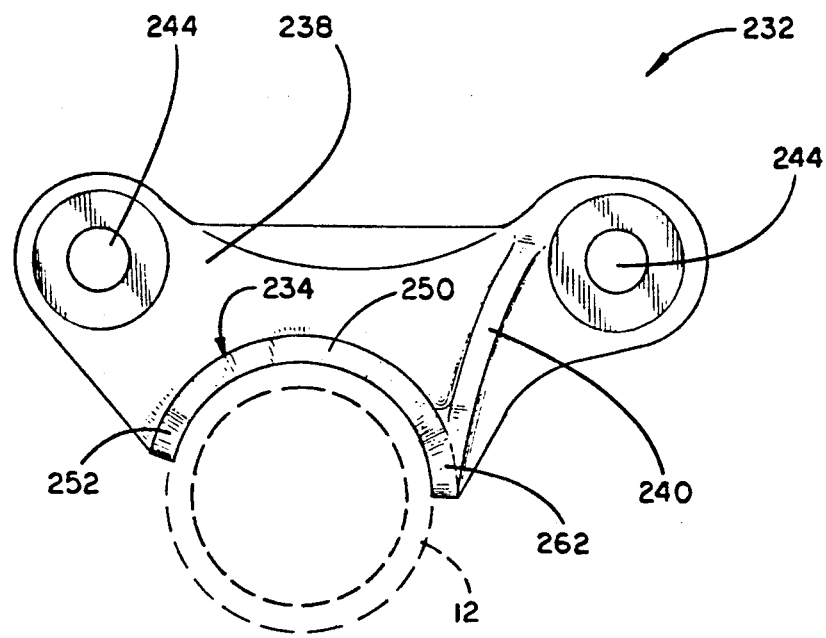
FIG. 12 is an end elevational view of the third embodiment of the axle bracket as seen in FIG. 11.

As seen in FIGS. 9 and 10, first finger 152 is slightly shorter than central tab portion 164 and second finger 162. The flexibility of fingers 152 and 162 or central tab portion 164 can be increased by tapering the width of the fingers or tab portion from the base toward the end of the fingers or tab portion. Flexibility of fingers 152 and 162 or central tab portion 164 can also be increased by narrowing the thickness of the fingers or tab portion from the base toward the end of the fingers or tab portion. In addition, flexibility of the wrapper plate 134 can be increased by tapering either first notch 150, second notch 160 or both, such that an acute angle is created between the interior surface of wrapper plate 134 and the surface of the notch.

A third embodiment of the axle bracket according to the invention is shown in FIGS. 11-14. In the description of this third embodiment, reference numerals of the first embodiment which are similar to the reference numerals in the third embodiment will merely be increased by 200.

The third embodiment of axle bracket 232 comprises a semi-cylindrical wrapper plate 234 which is rigidly secured to axle 12 by welding along a first longitudinal edge 256 and a second longitudinal edge 258. A first side plate 238 is mounted near one end of the wrapper plate 234 and a second side plate 242 is mounted near the other end of wrapper plate 234. The plates are mounted transverse to the longitudinal axis of axle 12. The spacing between opposing faces of first side plate 238 and second side plate 242 is substantially equal to the width of trailing arm 18.

A plurality of gussets 240 are mounted to wrapper plate 234 and sides plates 238 and 242. Gussets 240 provide strength and resistance to the numerous stresses which are exerted on suspension 16 between the wrapper plates 234 and side plates 238 and 242. As in the first two embodiments, gussets 240 are generally triangular in shape.

As in the first embodiment, axle bracket 234 of the third embodiment incorporates a pair of apertures 244 which are utilized to mount the bracket 232 to trailing arm 18 in the same manner as previously described in the first embodiment. In addition, wrapper plate 234 incorporates a hole 236 which provides clearance and flexibility for the wrapper plate 234 in the same manner as previously described in the first embodiment.

Figure 13:
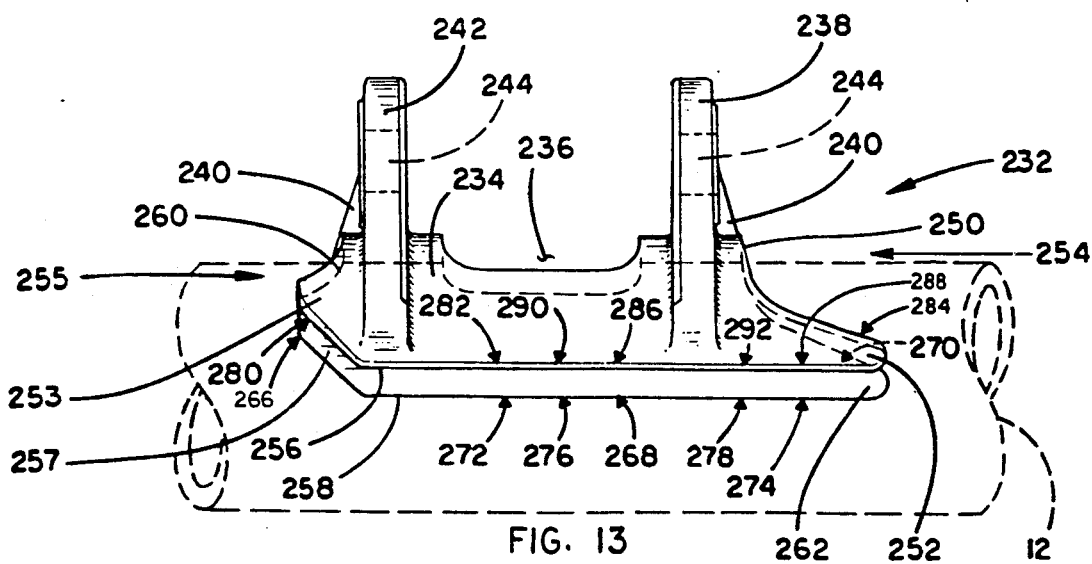
FIG. 13 is a side elevational view of the third embodiment of the axle bracket as seen in FIG. 11.
Figure 14:
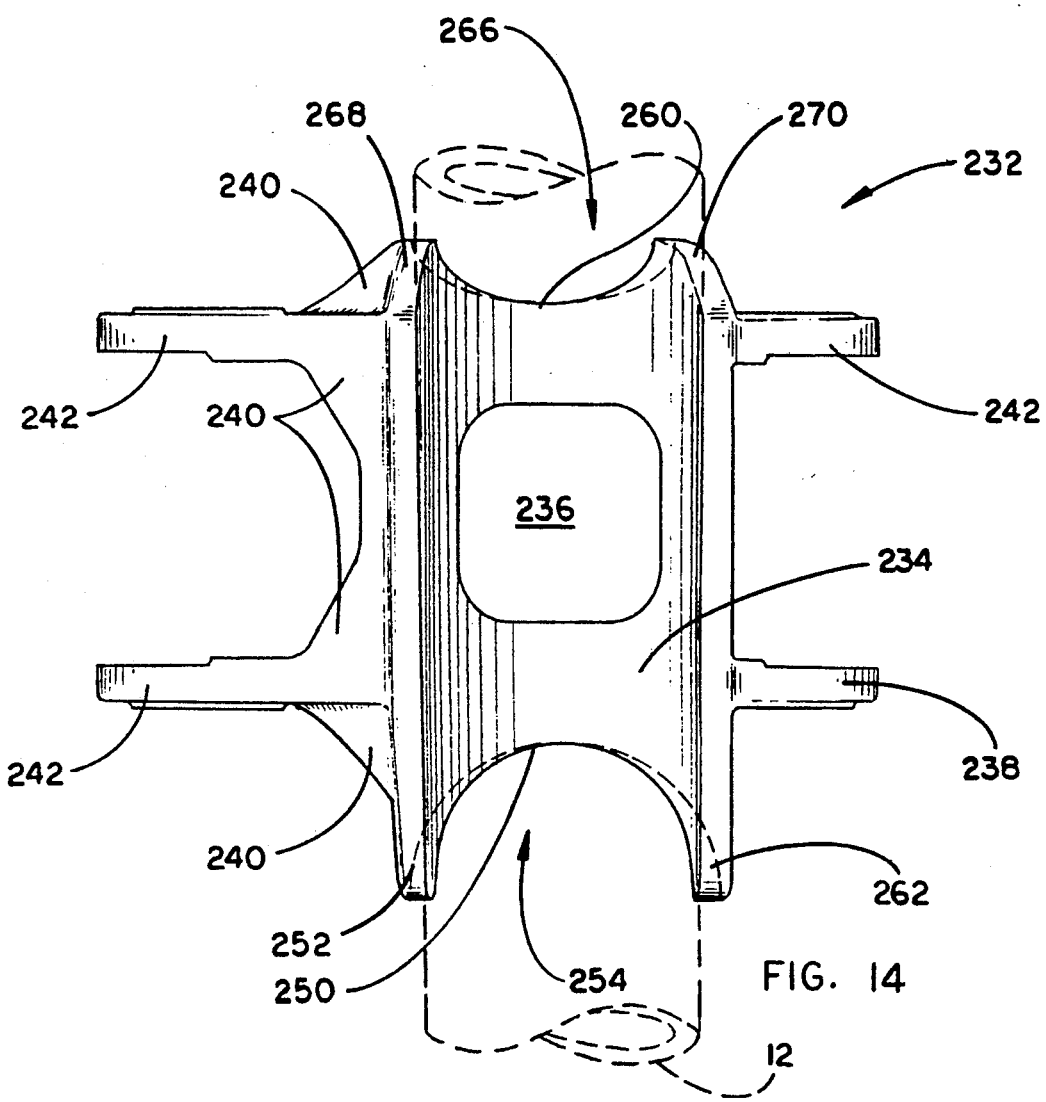
FIG. 14 is a bottom view of the third embodiment of the axle bracket as seen in FIG. 11.

Wrapper plate 234 incorporates a first notch 250 and a second notch 260 wherein the notches are substantially arcuate in shape. The first notch 250 is located on an inboard end 254 and traverses most of inboard end 254. Second notch 260 is located on an outboard end 255 of the wrapper bracket 234 and traverses most of outboard end 255. A first finger 252 is at the inboard rear corner of wrapper plate 234 and second finger 262 is located at the inboard front corner of bracket 234. A third finger 268 is located at the outboard rear corner of wrapper plate 234 and fourth finger 270 is located at the outboard front corner of bracket 234. As seen in FIGS. 13 and 14, first notch 250 is substantially deeper than second notch 260. Likewise, first finger 252 and second finger 262 are substantially longer than third finger 268 and fourth finger 270.

In the third embodiment of the invention, the bracket 232 is welded to axle 12 in the same manner as the first and second embodiments. That is, six weld passes are utilized along both edge 256 and edge 258 to create the three layer weld bead along the majority of the length of edges 256 and 258 and a two layer bead and one layer bead around fingers 252 and 262. The weld pass starting and stopping points are analogous to those described in the second embodiment. Therefore, the reference numerals for these welding starting and stop points will merely be increased by a factor of 100. FIG. 13 depicts the relative location of these weld starting and stopping points. The weld passes as described in the second embodiment are identical to the third embodiment and therefore will not be repeated. In addition, the greater or lesser number of weld beads described earlier for the first and second embodiments may likewise be incorporated as the welding method for the third embodiment.

While each of the particular embodiments discussed above relates to an axle bracket and trailing arm which are mounted on top of an axle It is to be understood that the invention may also be modified to be incorporated on an axle bracket and trailing arm which are mounted below the axle. Such an "under-slung" suspension system is shown in FIG. 16 In the description of this underslung embodiment, reference numerals of the first embodiment which are similar to the reference numerals in this embodiment will merely be increased by 400.

Figure 16:
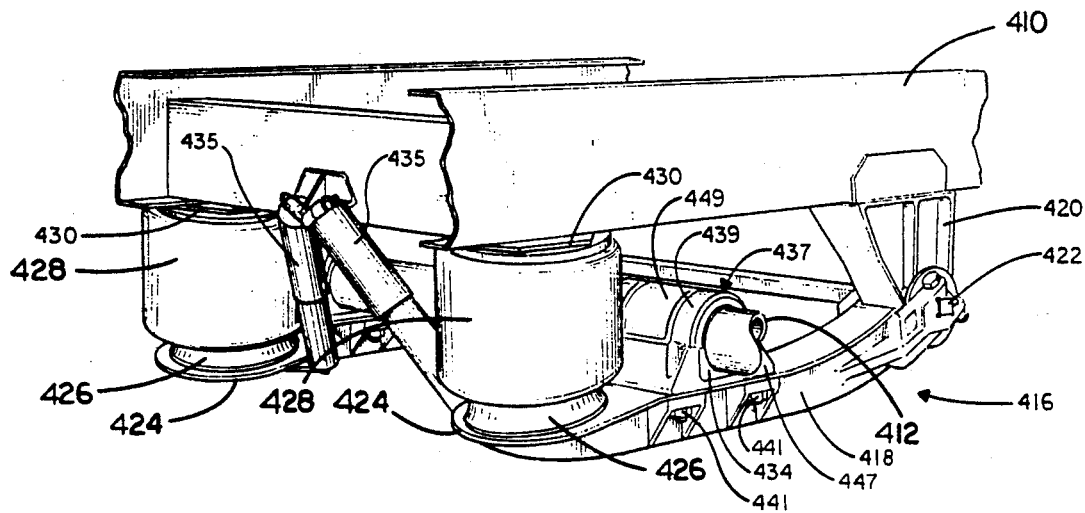
FIG. 16 is a partial perspective view of an underslung vehicle trailing arm suspension system according to the invention.

As seen in FIG. 16, a vehicle frame 410 has an axle 412 suspended therefrom by a suspension system 416 according to the invention The front of the vehicle is to the right side of the frame as seen in FIG. 16. Suspension 416 includes, at each side of the vehicle frame 410, a trailing arm 418 pivotably mounted to a frame bracket 420 depending from frame 410 at a pivotal mount 422. Each trailing arm 418 extends rearwardly of the vehicle and away from its pivotal mount 422 in a direction which is longitudinal of vehicle frame 410. Each trailing arm has an extension 424 which is fixedly attached to a pedestal 426 of an air spring 428 A top mounting plate 430 of air spring 428 is fixedly secured to vehicle frame 410. A pair of shock absorbers 435 may be fixedly attached between trailing arm extension 424 and vehicle frame 410.

Figure 17:
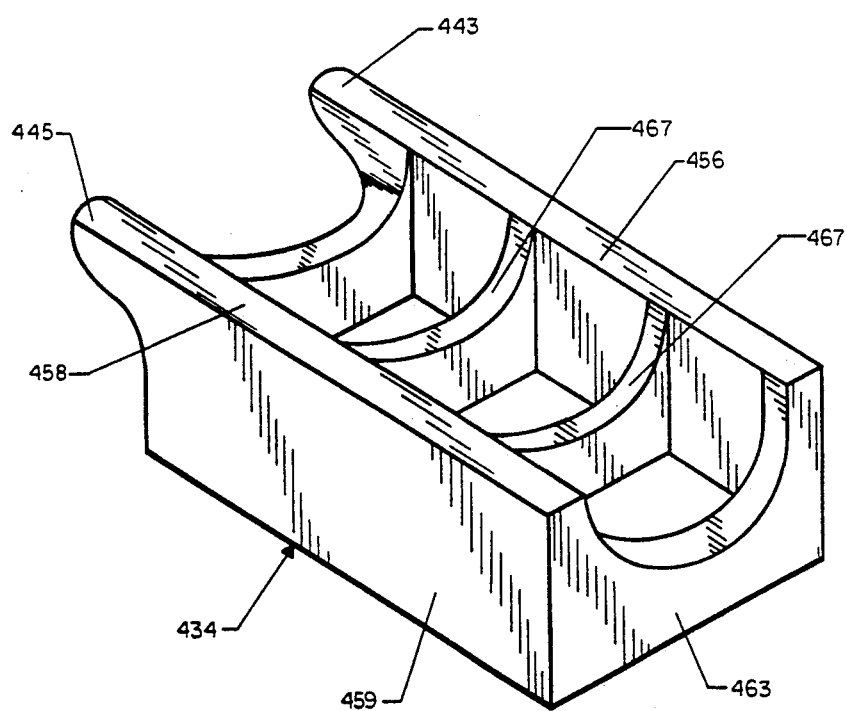
FIG. 17 is a perspective view of a wrapper plate suitable for use with an under-slung trailing arm suspension system according to the invention.

Axle 412 is rigidly connected to each trailing arm 418 by an axle adapter 437. Adapter 437 comprises a wrapper plate 434, a pair of U-shaped bolts 439, a beam seat 447 and a cap 449. Beam seat 447 has a U-shaped configuration such that wrapper plate 434 is received within adapter 437. Wrapper plate 434 is modified somewhat to incorporate opposite sides 459 and opposite ends 463 which are designed to be received within the U-shaped opening of beam seat 447. Struts 467 extend across the plate 434 to provide additional strength to the plate. In the assembled state, U-shaped bolts 439 surround the upper surface of cap 449, extend through openings (not shown) in beam seat 447 and extend through openings (not shown) in trailing arm 418. A plurality of nuts 441 are threaded onto the ends of U-shaped bolts 439 to secure the axle adapter to trailing arm 418. Elastomeric linings may be incorporated between the axle 412 and axle adapter 437 to provide a small degree of shock absorption and flexibility As seen in FIG. 17, the wrapper plate 434 is quite similar to the wrapper plate described in the third embodiment, that is the wrapper plate incorporates a first finger 443 and a second finger 445 on the inboard corners of wrapper plate 434. Wrapper plate 434 is fixedly attached to axle 412 by the welding process previously described along edges 456 and 458. The weld bead is thinner toward the end of fingers 443 and 445. In addition, the thinner weld bead may extend around the tip of finger 443 and 445. Further, the flexibility of fingers 443 and 445 may be increased by tapering the width of the fingers or by narrowing the thickness of fingers from the base toward the end of the fingers. The wrapper plate 434 and welding operation according to the invention enhances the ability of suspension system 416 to withstand the torsional and breaking torques endured during operation of the vehicle.

In addition, each of the embodiments described above incorporates a round axle and a complementary semicircular wrapper plate. It is to be understood that the invention may also be incorporated on axles which are not circular in cross section. Examples of such non-circular axles include axles with a square cross section, a rectangular cross section, or a D-shaped cross section While particular embodiments of the invention have been shown, it will be understood, of course, that the invention is not limited thereto since modifications may be made by those skilled in the art. particularly in light of the foregoing teachings. Reasonable variation and modification are possible within the foregoing disclosure of the invention without departing from the scope of the invention.

We claim:

1. A vehicle suspension system for mounting ground-engaging wheels to a vehicle frame, the suspension system comprising at least two substantially rigid arms secured to opposite sides of the frame through substantially aligned pivot mounts; at least one wheel-carrying axle between said arms; and a bracket assembly securing said axle to each of said arms; said bracket assembly comprising a wrapper plate having an elongated surface complementary to the axle; the wrapper plate having longitudinal side edges and end edges; and welds between the side edges of the wrapper plate and the axle to secure the wrapper plate to the axle; the improvement which comprises:

the wrapper plate having a notch at one end edge forming at least one finger at one corner of said wrapper plate; and one of said welds extending along an outer edge of said finger.

2. A vehicle suspension system according to claim 1 wherein said one weld extends around said finger and along a portion of an inner edge of said finger.

3. A vehicle suspension system according to claim 2 wherein said one edge of said wrapper plate is an inboard edge.

4. A vehicle suspension system according to claim 3 wherein said finger extends beyond an inboard end of said wrapper plate.

5. A vehicle suspension system according to claim 4 wherein said finger tapers along the length thereof such that an end of the finger is of less width than a base.

6. A vehicle suspension system according to claim 5 wherein said finger narrows along the length thereof such that an end of the finger is of less thickness than a base.

7. A vehicle suspension system according to claim 6 wherein said notch has a tapered surface which forms an acute angle between said complementary surface of said wrapper plate and the tapered surface of said notch.

8. A vehicle suspension system according to claim 4 and further comprising a second finger at a second corner of said wrapper plate and a second weld which extends along an outer edge of said second finger.

9. A vehicle suspension system according to claim 8 wherein said second weld extends around said second finger and along a portion of an inner edge thereof.

10. A vehicle suspension system according to claim 8 wherein at least one of said one or second fingers tapers along the length thereof such that an end of said finger is of less width than a base thereof.

11. A vehicle suspension system according to claim 8 wherein at least one of said one or second fingers narrows along the length thereof such that an end of said finger is of less thickness than a base thereof.

12. A vehicle suspension system according to claim 8 wherein a second notch forms said second finger.

13. A vehicle suspension system according to claim 12 wherein a central tab portion is created on the inboard end of said wrapper plate and is disposed between said first notch and said second notch.

14. A vehicle suspension system according to claim 12 wherein at least one of said first or second notches has a tapered surface which forms an acute angle between said complementary surface and said tapered surface.

15. A vehicle suspension system according to claim 1 and further comprising a second notch at another end edge of said wrapper plate forming at least one additional finger.

16. A vehicle suspension system according to claim 15 wherein said first notch is arcuate in shape and generally located at a central portion of said inboard edge.

17. A vehicle suspension system according to claim 16 wherein said first notch forms a second finger at a second corner of said wrapper plate.

18. A vehicle suspension system according to claim 17 wherein at least one of said one or second fingers tapers along the length thereof such that an end of said finger is of less width than a base.

19. A vehicle suspension system according to claim 17 wherein at least one of said one or second fingers narrows along the length thereof such that an end of said finger is of less thickness than a base.

20. A vehicle suspension system according to claim 15 wherein said second notch is located at a central portion of said other end edge.

21. A vehicle suspension system according to claim 20 wherein said second notch is generally arcuate in shape.

22. A vehicle suspension system according to claim 20 wherein a second notch forms third and fourth fingers at corners of said wrapper plate.

23. A vehicle suspension system according to claim 16 wherein at least one of said first and second notches has a tapered surface which forms an acute angle between said complementary surface of said wrapper plate and said tapered surface.

24. A vehicle suspension system according to claim 1 wherein said one edge of said wrapper plate is an inboard edge.

25. A vehicle suspension system according to claim 1 wherein said finger extends beyond an inboard end of said wrapper plate.

26. A vehicle suspension system according to claim 1 wherein said notch has a tapered surface which forms an acute angle between said complementary surface of said wrapper plate and said tapered surface of said notch.

27. A vehicle suspension system according to claim 1 and further comprising a second finger at a second corner of said wrapper plate and a second weld which extends along an outer edge of said second finger.

28. A vehicle suspension system according to claim 27 wherein said one weld extends around said one finger and along a portion of an inner edge of said one finger and said second weld extends around said second finger and along a portion of an inner edge of said second finger.

29. A vehicle suspension system according to claim 28 wherein at least one of said one or second fingers tapers along the length thereof such that an end of said finger is of less width than a base thereof.

30. A vehicle suspension system according to claim 28 wherein at least one of said one or second fingers narrows along the length thereof such that an end of said finger is of less thickness than a base thereof.

31. A vehicle suspension system according to claim 29 wherein a second notch forms said second finger and a central tab portion is created on an inboard end and is disposed between said first notch and said second notch.

32. A vehicle suspension system according to claim 1 and further comprising a second notch at another end edge of said wrapper plate forming at least additional finger.

33. A vehicle suspension system according to claim 32 wherein said first notch is arcuate in shape and generally located at a central portion of an inboard edge.

34. A vehicle suspension system according to claim 33 wherein said first notch forms a second finger at a second corner of said wrapper plate.

35. A vehicle suspension system according to claim 32 wherein said second notch is located at a central portion of said other end edge.

36. A vehicle suspension system according to claim 35 wherein said second notch is generally arcuate in shape.

37. A vehicle suspension system according to claim 35 wherein a second notch forms third and fourth fingers at corners of said wrapper plate.

38. A vehicle suspension system for mounting ground-engaging wheels to a vehicle frame, the suspension system comprising at least two substantially rigid arms secured to opposite sides of the frame through substantially aligned pivot mounts; at least one wheel-carrying axle between said arms; and a bracket assembly securing said axle to each of said arms; said bracket assembly comprising a wrapper plate having an elongated surface complementary to the axle; the wrapper plate having longitudinal side edges and end edges; and welds between the side edges of the wrapper plate and the axle to secure the wrapper plate to the axle; the improvement which comprises:

the wrapper plate having at one end edge, a finger extending axially, and one of said welds extending along an outer edge of said finger.

39. A vehicle suspension system according to claim 38 wherein said one weld extends around said finger and along a portion of an inner edge of said finger.

40. A vehicle suspension system according to claim 39 wherein said finger tapers along the length thereof such that an end of the finger is of less width than a base.

41. A vehicle suspension system according to claim 39 wherein said finger narrows along the length thereof such that an end of the finger is of less thickness than a base.

* * * * *